US009694776B2

(12) United States Patent
Nelson et al.

(10) Patent No.: US 9,694,776 B2
(45) Date of Patent: Jul. 4, 2017

(54) LATERAL ACCESS LIMITATION SYSTEM FOR A VEHICLE

(71) Applicant: Oshkosh Corporation, Oshkosh, WI (US)

(72) Inventors: Joseph D. Nelson, Oshkosh, WI (US); Troy L. Meyers, Oshkosh, WI (US); Matthew P. Deinema, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 15/228,967

(22) Filed: Aug. 4, 2016

(65) Prior Publication Data

US 2017/0036628 A1    Feb. 9, 2017

Related U.S. Application Data

(60) Provisional application No. 62/201,983, filed on Aug. 6, 2015.

(51) Int. Cl.
*B60R 19/56*    (2006.01)

(52) U.S. Cl.
CPC .................... *B60R 19/565* (2013.01)

(58) Field of Classification Search
CPC ....... B60R 19/42; B60R 19/02; B60R 19/565; B60R 19/56; B60R 2021/0006
See application file for complete search history.

(56) References Cited

U.S. PATENT DOCUMENTS

| | | | |
|---|---|---|---|
| 6,478,317 B2 | 11/2002 | Konop | |
| 7,111,858 B2 | 9/2006 | Manser et al. | |
| 7,140,461 B2 | 11/2006 | Morrow | |
| 7,198,130 B2 | 4/2007 | Schimke | |
| 7,226,080 B2 | 6/2007 | Humphries | |
| 7,270,346 B2 | 9/2007 | Rowe et al. | |
| 7,357,203 B2 | 4/2008 | Morrow et al. | |
| 7,407,204 B2 * | 8/2008 | Eriksson ............... | B60R 19/565 293/102 |
| 7,419,021 B2 | 9/2008 | Morrow et al. | |
| 7,448,460 B2 | 11/2008 | Morrow et al. | |
| 7,520,354 B2 | 4/2009 | Morrow et al. | |
| 7,931,103 B2 | 4/2011 | Morrow et al. | |
| 8,317,239 B2 * | 11/2012 | Martin .................... | B60R 19/38 293/102 |
| 8,561,735 B2 | 10/2013 | Morrow et al. | |
| 2008/0012280 A1 | 1/2008 | Humphries | |
| 2008/0150350 A1 | 6/2008 | Morrow et al. | |

* cited by examiner

*Primary Examiner* — John Walters
*Assistant Examiner* — James Triggs
(74) *Attorney, Agent, or Firm* — Foley & Lardner LLP

(57) ABSTRACT

A lateral access limitation system for a vehicle includes a first structural member configured to be coupled to a side portion of the vehicle, a second structural member including a first end and an opposing second end, the first end and the opposing second end of the second structural member releasably coupled to the first structural member, and a third structural member coupled to the second structural member. The third structural member is positioned to prevent unintended access to a protected region. The second structural member and the third structural member are configured to selectively pivot about both the first end and the opposing second end of the second structural member to facilitate accessing the protected region.

15 Claims, 13 Drawing Sheets

LATERAL ACCESS LIMITATION SYSTEM FOR A VEHICLE

CROSS-REFERENCE TO RELATED PATENT APPLICATIONS

This application claims the benefit of U.S. Provisional Patent Application No. 62/201,983, filed Aug. 6, 2015, which is incorporated herein by reference in its entirety.

BACKGROUND

Commercial vehicles may be provided with lateral access limitation systems. The lateral access limitation systems traditionally include structural members positioned to prevent unintended access to a region around and/or beneath the vehicle. The lateral access limitation systems make accessing components located behind the structural members difficult and may not fit various chassis and body designs of commercial vehicles.

SUMMARY

One exemplary embodiment relates to a lateral access limitation system for a vehicle that includes a first structural member configured to be coupled to a side portion of the vehicle, a second structural member including a first end and an opposing second end, the first end and the opposing second end of the second structural member releasably coupled to the first structural member, and a third structural member coupled to the second structural member. The third structural member is positioned to prevent unintended access to a protected region. The second structural member and the third structural member are configured to selectively pivot about both the first end and the opposing second end of the second structural member to facilitate accessing the protected region.

Another exemplary embodiment relates to a lateral access limitation system for a vehicle that includes a bracket configured to be coupled to at least one of a chassis and a body of the vehicle, a leg configured to interface with the bracket, and a rail positioned to prevent unintended access to a protected region. The rail is slidably coupled to the leg and selectively repositionable along a longitudinal length of the vehicle relative to the leg and the bracket. The leg and the rail are selectively repositionable relative to the bracket between a first angled orientation, a second angled orientation, and an access limitation orientation.

Another exemplary embodiment relates to a vehicle that includes a chassis, a body coupled to the chassis, and a vehicle access limitation system positioned to prevent unintended access to a protected region of the vehicle. The vehicle access limitation system includes a bracket coupled to at least one of the chassis and the body of the vehicle, a leg having a lower end and an upper end, the lower end and the upper end of the leg releasably and pivotally coupled to the bracket, and a rail slidably coupled to the leg and selectively repositionable along a length of the vehicle relative to the leg and the bracket. The leg and the rail are configured to selectively pivot relative to the bracket downward and upward about the lower end and the upper end of the leg to thereby provide access to the protected region.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a lateral access limitation system is coupled to a lateral side of a vehicle (e.g., a frame, a body, etc.). In one embodiment, the lateral access limitation system is longitudinally selectively repositionable along the lateral side of the vehicle. The lateral access limitation system may prevent unintentional access or entry into a region defined between the front and rear wheels of the vehicle. The lateral access limitation system may be disposed along (e.g., surround, protect, enclose, etc.) the protected region. Lateral access limitation systems are traditionally designed for a specific body or chassis of a vehicle to satisfy various regulatory requirements (e.g., European ECE Regulation No. 73; Boston City Code, ordinances, Chapter IV Section 4-8; New York City Int. No. 198-A, etc.). Traditional systems may be custom weldments and/or require one or more custom-drilled mounting holes to appropriately attach the system onto a vehicle and satisfy the regulations. The lateral access limitation system of the present disclosure is modular (e.g., adjustable, adaptable, etc.) and thereby satisfies body and chassis variability, improving manufacturability, while still meeting the various regulations. The lateral access limitation system includes a clamp that facilitates longitudinally repositioning a portion of the lateral access limitation system (e.g., based on the application, etc.). The lateral access limitation system also improves the serviceability of a vehicle that has the lateral access limitation system installed. In one embodiment, the serviceability is improved at least because the lateral access limitation system is configured to pivot both upward and downward. Such a "dual swinging capability" facilitates accessing the protected region from either the top or bottom of the lateral access limitation system, providing quicker and easier access to variously positioned components within the protected region (e.g., a battery system, a hydraulic system, a diesel exhaust fluid (DEF) tank, a fuel tank, a tool box, a storage compartment, etc.).

Figure 1:
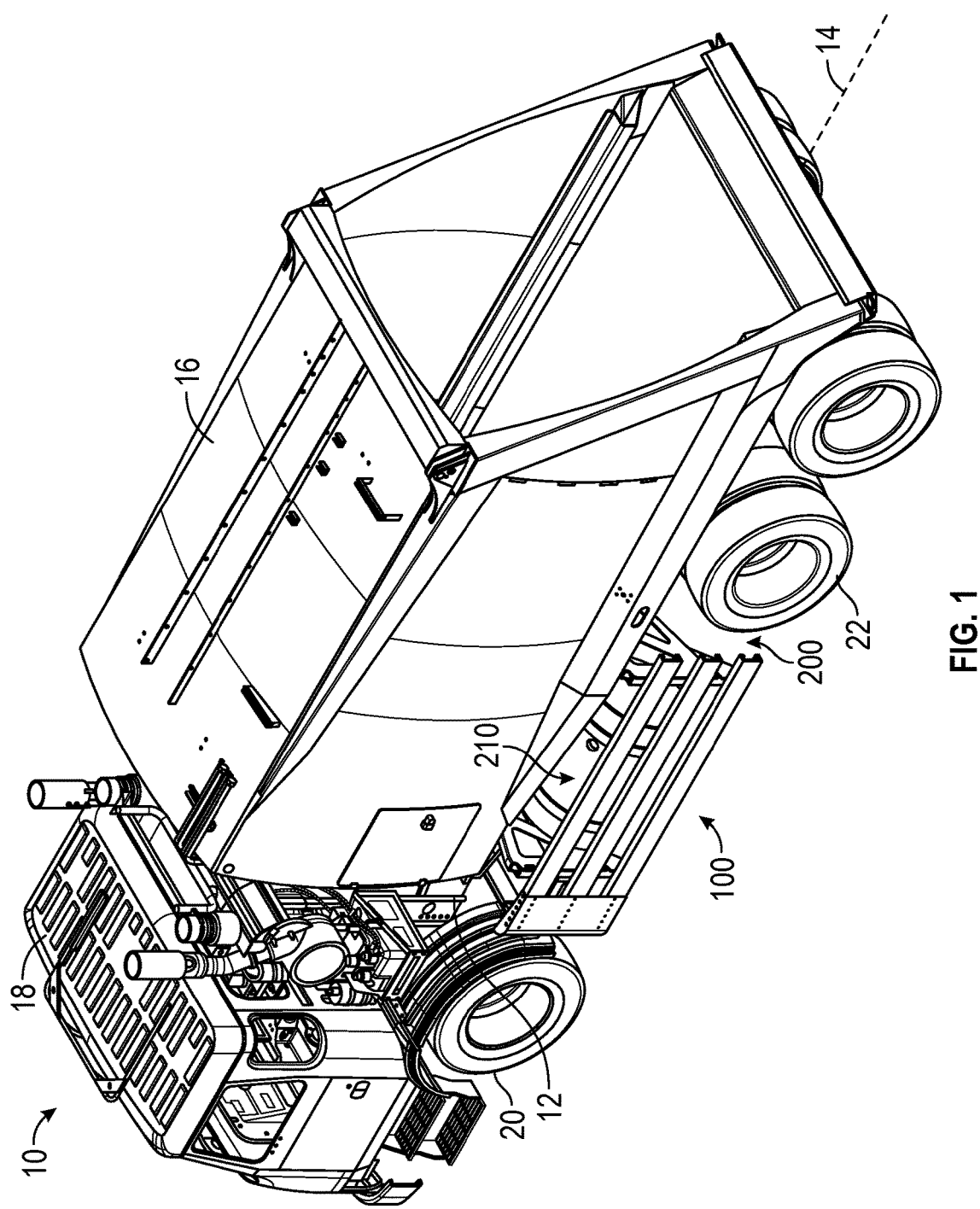
FIG. 1 is a perspective view of a vehicle including a lateral access limitation system, according to an exemplary embodiment.
Figure 2:
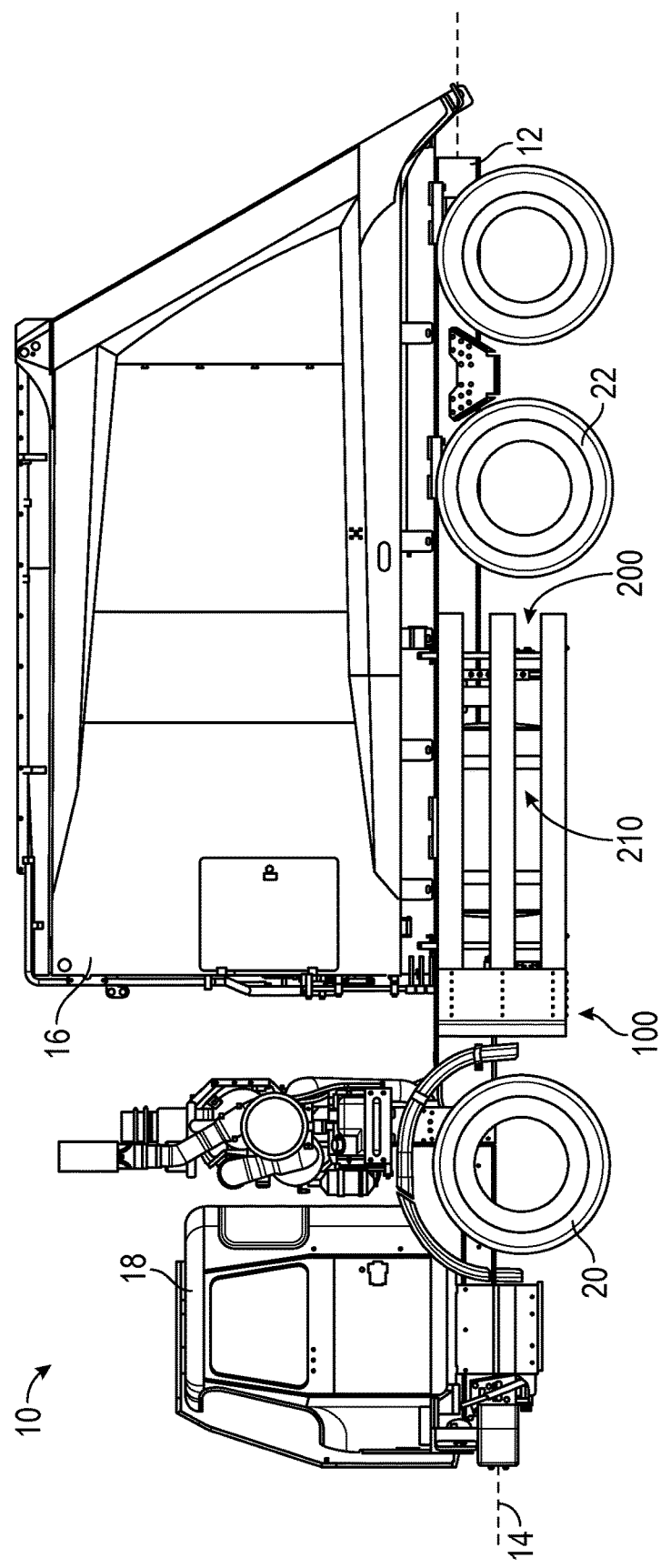
FIG. 2 is a left side view of a vehicle including a lateral access limitation system, according to an exemplary embodiment.
Figure 3:
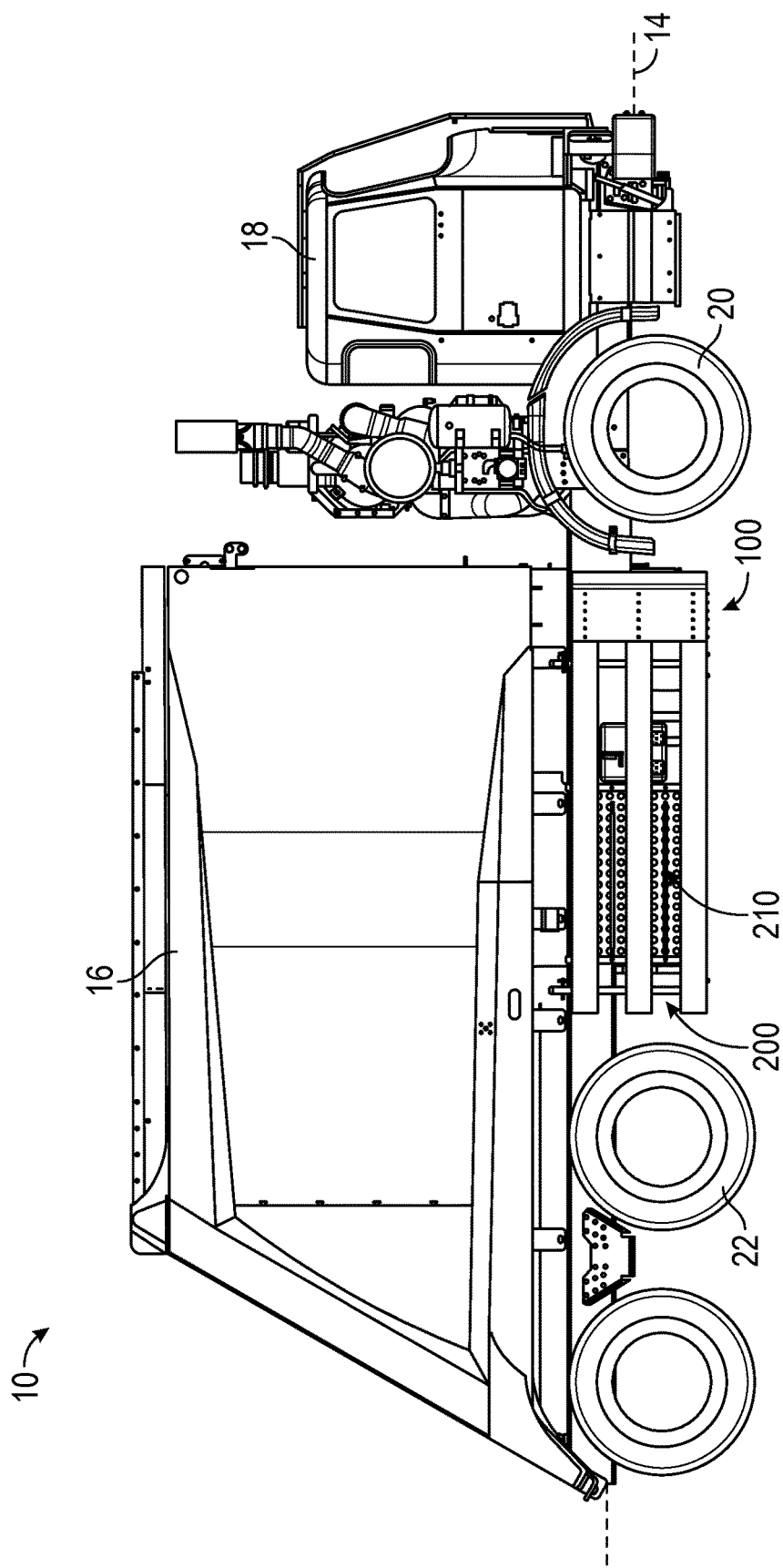
FIG. 3 is a right side view of a vehicle including a lateral access limitation system, according to an exemplary embodiment.
Figure 4:
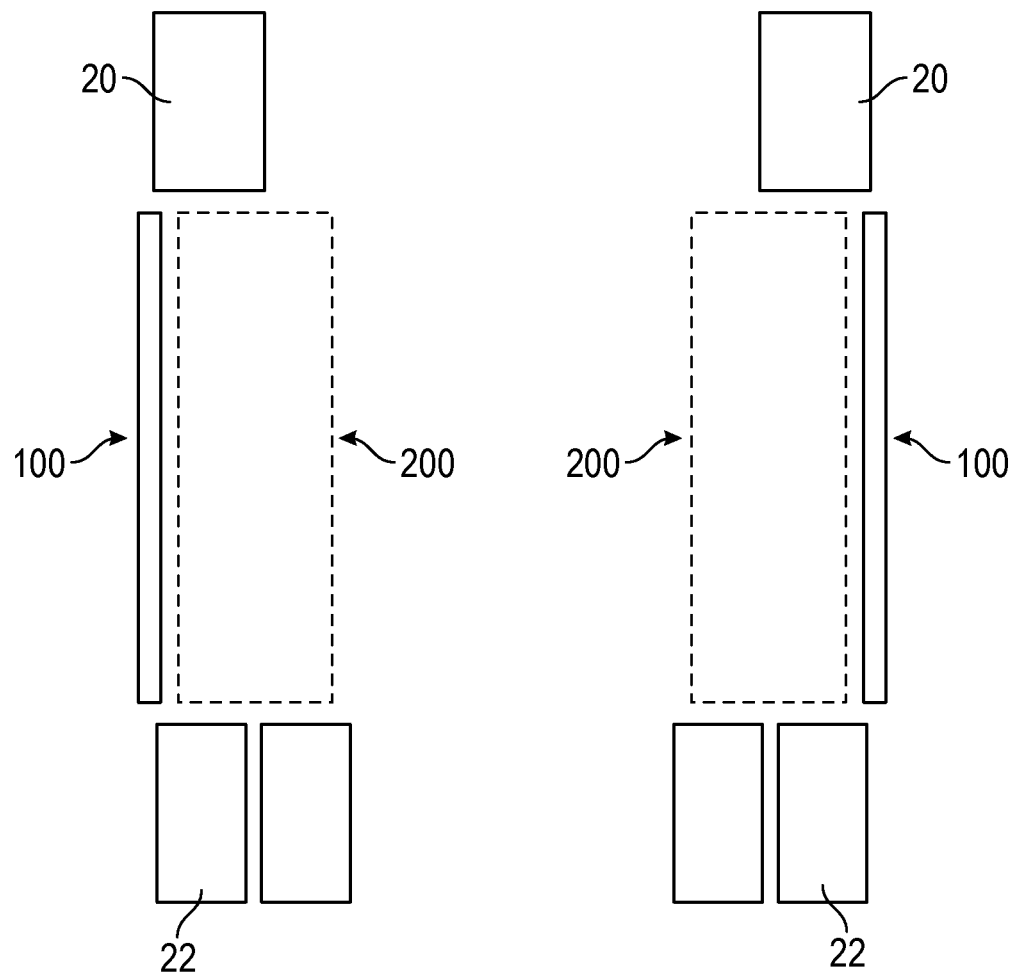
FIG. 4 is a top schematic view of a vehicle including a lateral access limitation system, according to an exemplary embodiment.

According to the exemplary embodiment shown in FIGS. 1-12, a lateral access limitation system, shown as system 100, is positioned on a vehicle, shown as truck 10. The system 100 prevents unintended and/or unauthorized access to a region, shown as protected region 200, associated with the truck 10. According to an exemplary embodiment, the truck 10 is a refuse truck. In other embodiments, the truck 10 is an aerial truck, a rescue truck, a concrete mixer truck, a commercial truck, a tanker, an ambulance, a fire apparatus, a military vehicle, or still another vehicle. As shown in FIGS. 1-3, the truck 10 includes a chassis, shown as frame 12, defining a longitudinal axis 14. The frame 12 supports a body assembly, shown as body assembly 16, a number axles with wheel and tire assemblies, shown as front wheels 20 and rear wheels 22, and a cab, shown as front cabin 18. The longitudinal axis 14 may be generally aligned with a frame rail of the truck 10 (e.g., front-to-back, etc.).

As shown in FIGS. 1-5, the protected region 200 is longitudinally positioned between the front wheels 20 and the rear wheels 22, along one or both lateral sides of the truck 10. In other embodiments, the protected region 200 is positioned at a front end and/or a rear end of the truck 10. As shown in FIGS. 1-5, the system 100 is disposed along a side of the protected region 200. In other embodiments, the system 100 entirely encloses and/or surrounds the protected region 200. One or more vehicle components 210 may be positioned within the protected region 200. According to an exemplary embodiment, the vehicle components 210 include a battery system, a hydraulic system, a pneumatic system, a fuel tank, a DEF tank, a tool box, and/or a storage compartment. As shown in FIGS. 1-5, the system 100 is provided at each lateral side of the truck 10. In other embodiments, the system 100 is provided on only one side of the truck 10. The system 100 may extend laterally outward further than the body assembly 16 (e.g., protrude from the body assembly 16, etc.), the system 100 may be recessed into or inside of the body assembly 16, or the system 100 may be flush with an outer sidewall of the body assembly 16, according to various embodiments. In one embodiment, the system 100 is coupled to the frame 12 of the truck 10. In another embodiment, the system 100 is coupled to the body assembly 16 of the truck 10. In some embodiments, the system 100 is coupled to one of the lateral sides of the truck 10. In alternate embodiments, the system 100 is coupled to the front cabin 18 (e.g., the front of the truck 10, etc.) and/or the back of the body assembly 16 (e.g., the rear of the truck 10, etc.).

Figure 5:
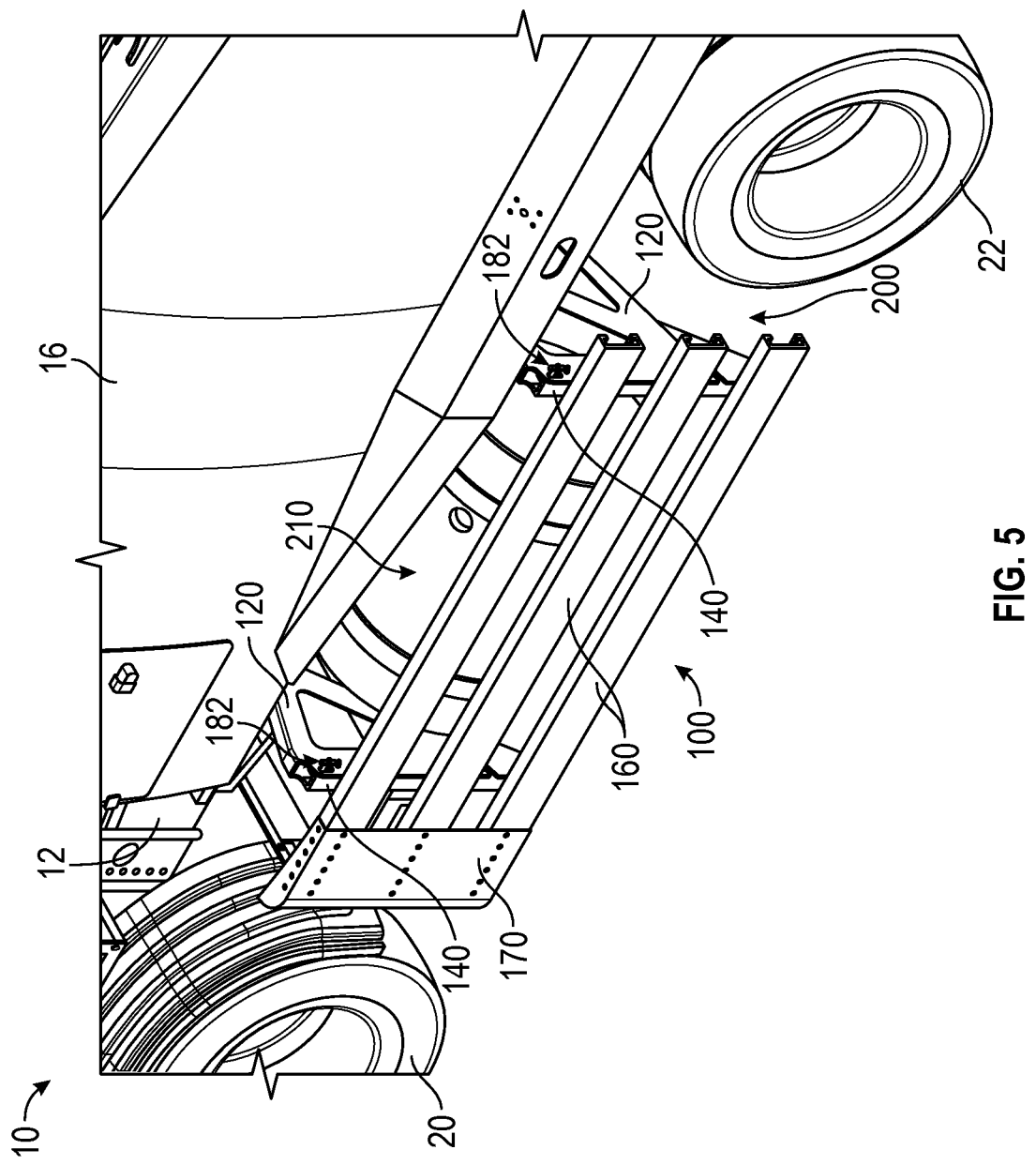
FIG. 5 is a perspective view of a lateral access limitation system coupled to a vehicle, according to an exemplary embodiment.
Figure 6:
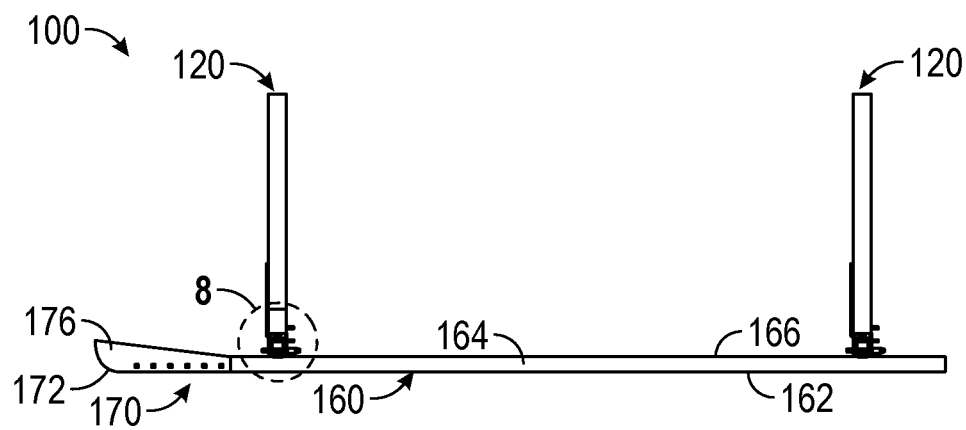
FIG. 6 is a top view of a lateral access limitation system, according to an exemplary embodiment.
Figure 7:
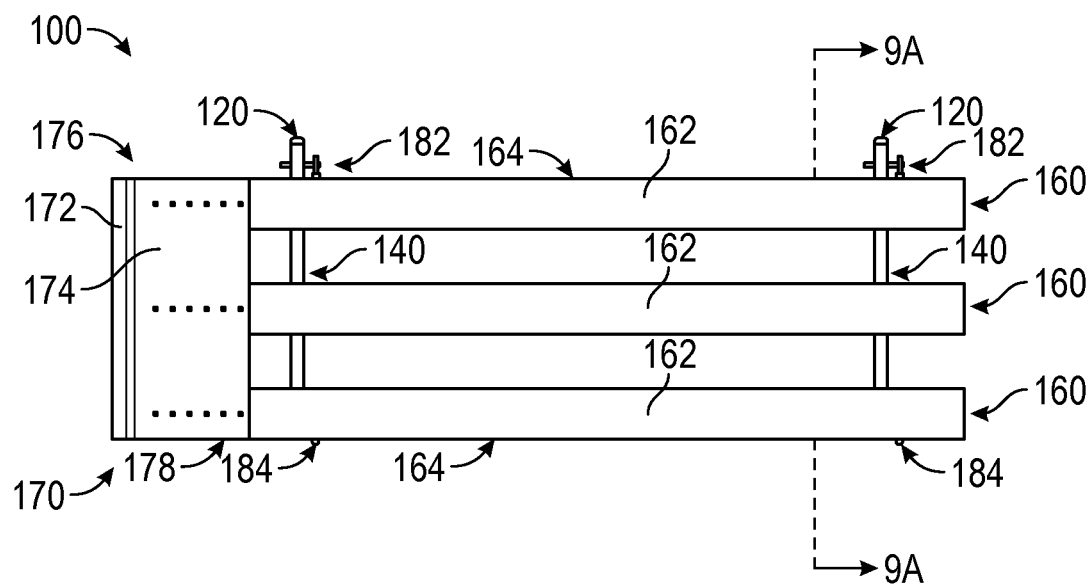
FIG. 7 is a side view of a lateral access limitation system, according to an exemplary embodiment.

As shown in FIGS. 5-9C, the system 100 includes first structural members, shown as mounting brackets 120; second structural members, shown as legs 140; a plurality of third structural members, shown as rails 160; a front structural member, shown as deflector 170; and a coupler, shown as clamp 190. As shown in FIGS. 5-7, the system 100 includes two mounting brackets 120 and two corresponding legs 140. In other embodiments, the system 100 includes more or fewer mounting brackets 120 and/or legs 140 (e.g., one, three, four, etc.).

Figure 9A:
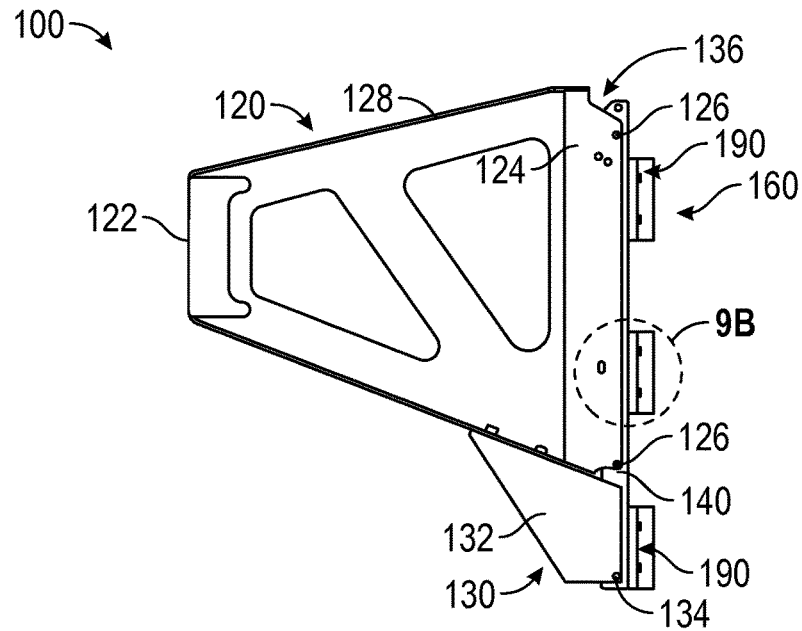
FIG. 9A is a cross-sectional view of a lateral access limitation system, according to an exemplary embodiment.

As shown in FIG. 5, the mounting brackets 120 are configured couple other components of the system 100 to the truck 10. According to an exemplary embodiment, the mounting brackets 120 are coupled (e.g., bolted, welded, etc.) to at least one of the frame 12 and the body assembly 16 of the truck 10. As shown in FIG. 9A, the mounting brackets 120 include a mounting portion, shown as mount 122, and a surface, shown as top surface 128. In one embodiment, the mount 122 is configured to be coupled to the frame 12 of the truck 10. In another embodiment, the top surface 128 is configured to be coupled to the body assembly 16 of the truck 10. In some embodiments, at least one of the mount 122 and the top surface 128 of the mounting brackets 120 couple other components of the system 100 to the truck 10.

Figure 8:
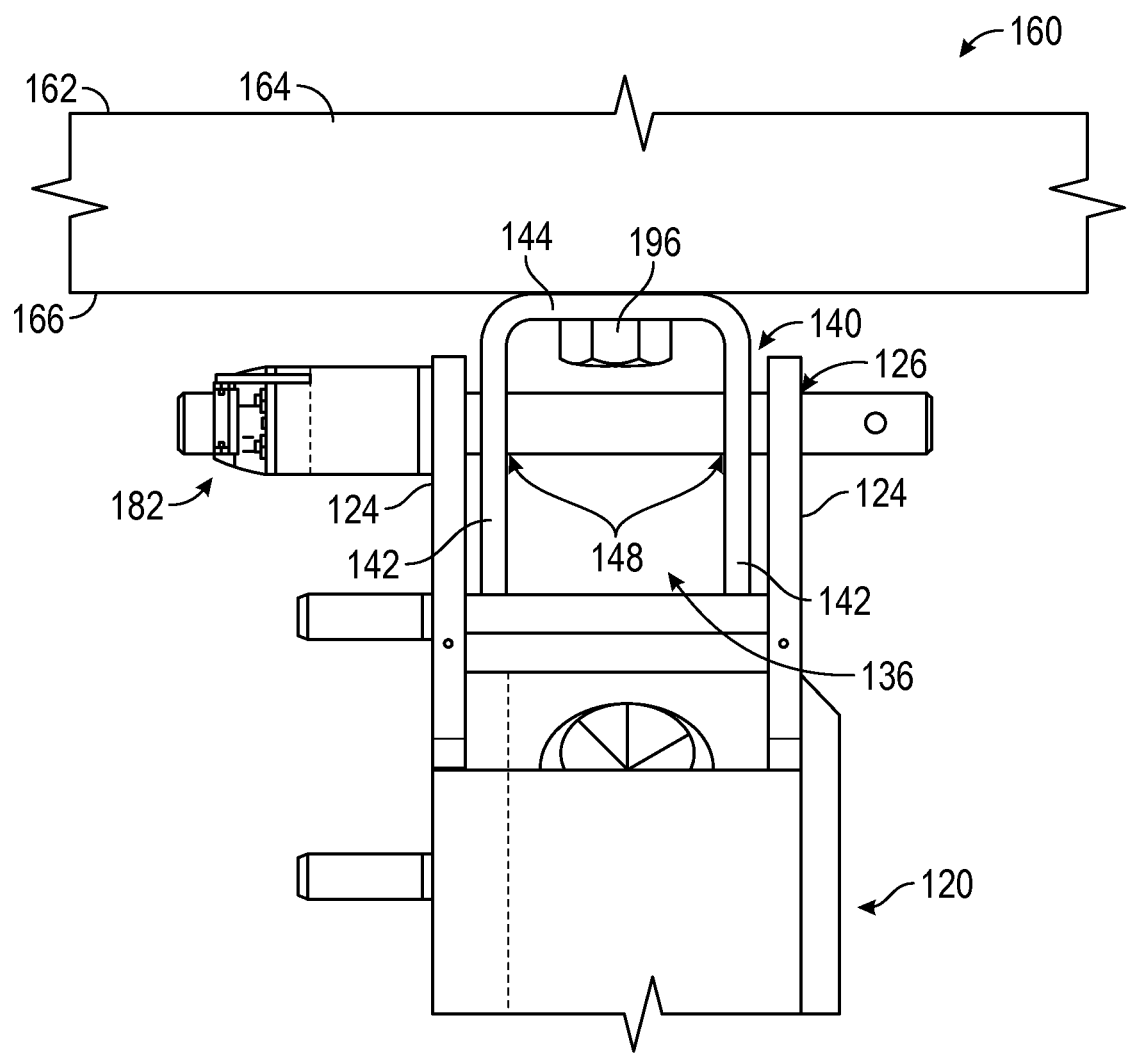
FIG. 8 is a detailed top view of a lateral access limitation system, according to an exemplary embodiment.

As shown in FIGS. 8-9A, the mounting brackets 120 include a pair of sidewalls, shown as sidewalls 124. The sidewalls 124 define apertures, shown as through-holes 126, positioned at an upper end and a lower end of the sidewalls 124. The sidewalls 124 further define a cavity, shown as slot 136. As shown in FIG. 9A, the mounting brackets 120 include an extension, shown as extension bracket 130. According to an exemplary embodiment, the extension bracket 130 is coupled to a lower end of the mounting bracket 120. In other embodiments, the extension bracket 130 is otherwise positioned (e.g., coupled to an upper end of the mounting bracket 120 etc.). In one embodiment, the extension bracket 130 includes a pair of sidewalls, shown as sidewalls 132, that define a slot that corresponds with the slot 136 of the mounting bracket 120. The sidewalls 132 further define an aperture, shown as through-hole 134.

Figure 9B:
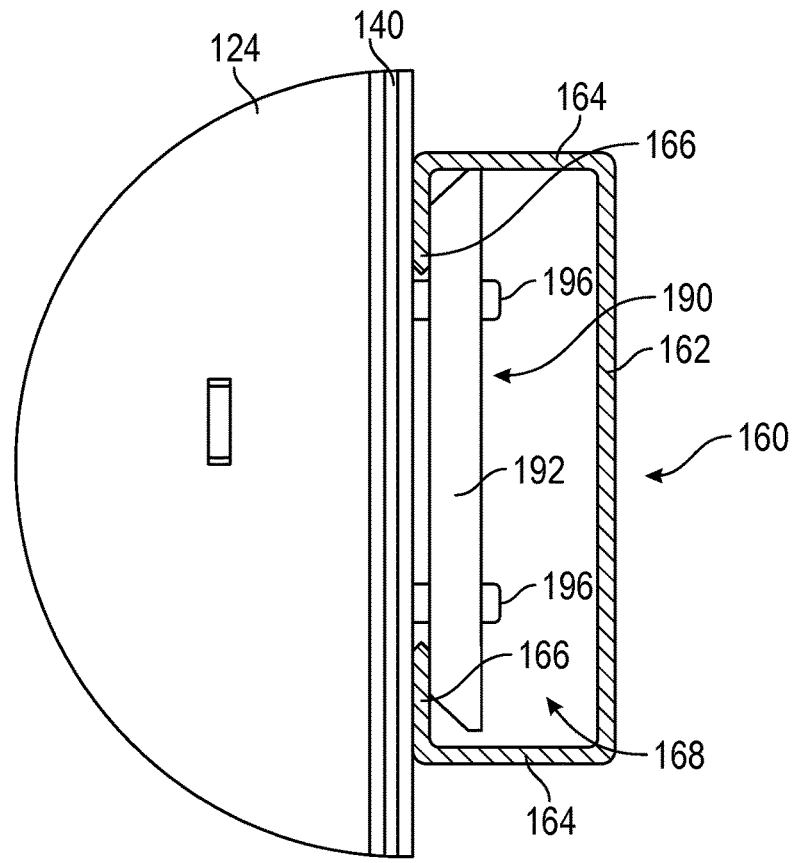
FIG. 9B is a detailed cross-sectional view of a lateral access limitation system, according to an exemplary embodiment.
Figure 9C:
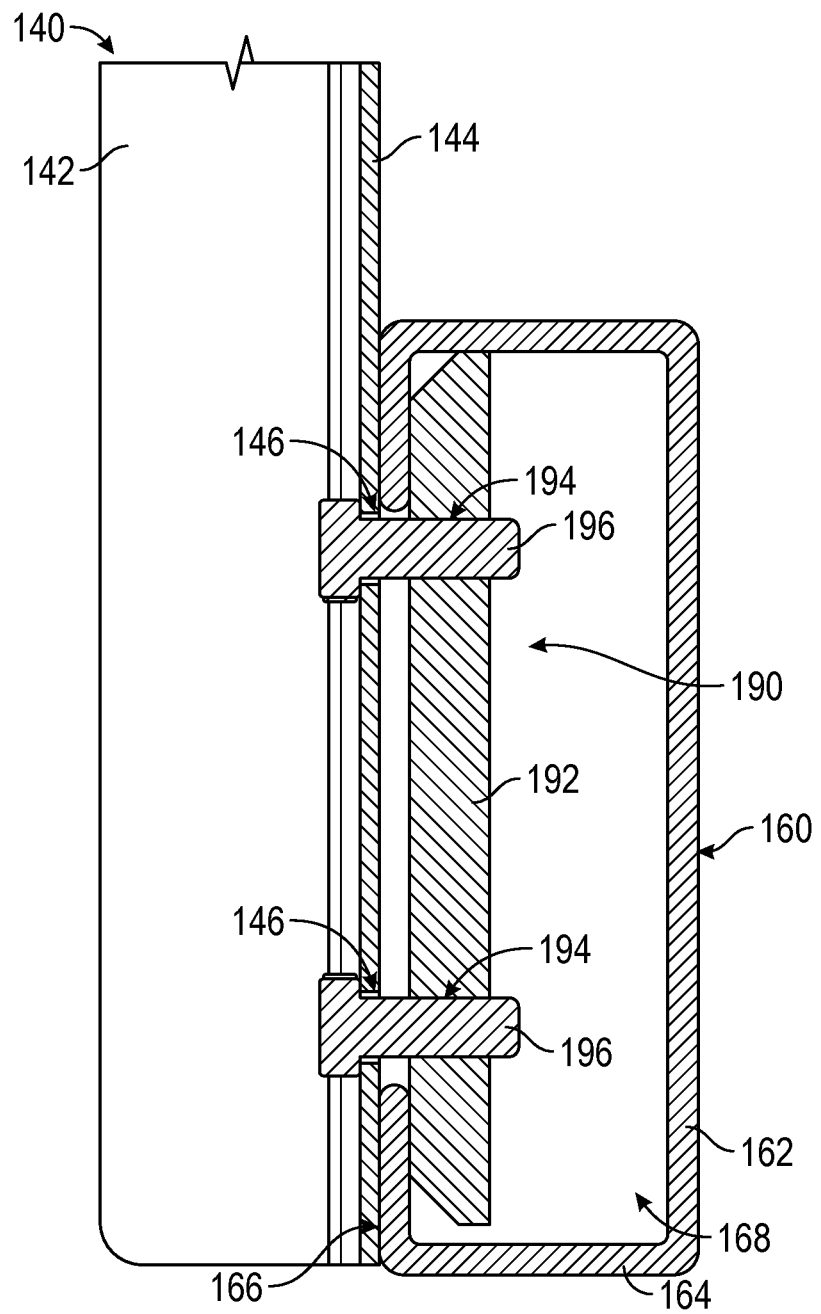
FIG. 9C is a detailed cross-sectional view of a lateral access limitation system, according to an exemplary embodiment.
Figure 11A:
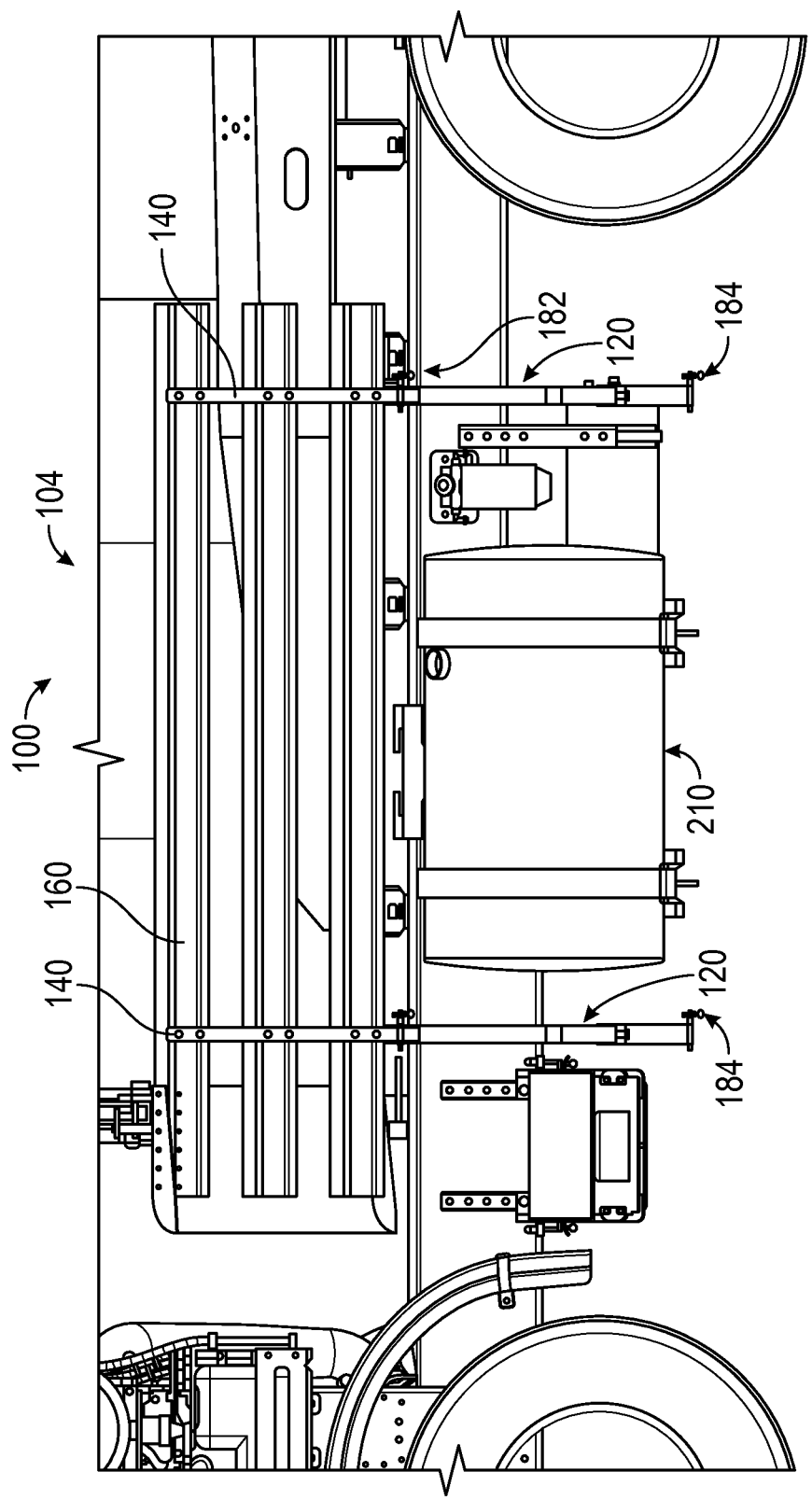
FIGS. 11A-11B are various views of a lateral access limitation system configured in a second orientation, according to an exemplary embodiment.
Figure 11B:
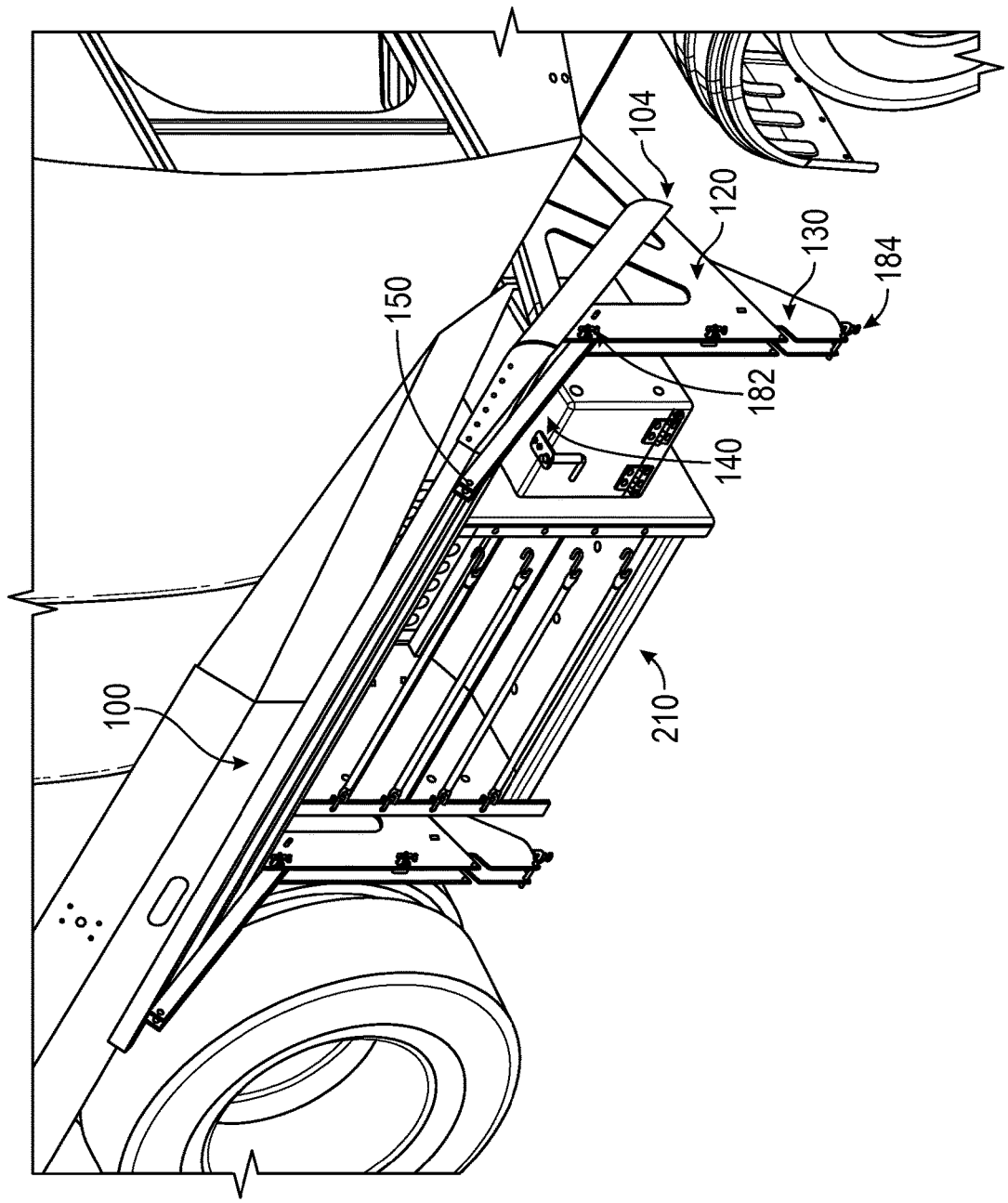

As shown in FIGS. 8 and 9C, the legs 140 include a wall, shown as front wall 144, and a pair of sidewalls, shown as sidewalls 142. According to the exemplary embodiment shown in FIG. 8, the sidewalls 142 and the front wall 144 define a "U" channel shape of the leg 140. In other embodiments, the leg 140 is box-shaped (e.g., square, rectangular, etc.), a hexagonal shape, or an "L-shaped" channel. As shown in FIG. 8, the leg 140 is configured to be disposed within the slot 136 and interface with the mounting bracket 120. As shown in FIG. 8, the sidewalls 142 of the legs 140 define first apertures, shown as upper through-holes 148. According to an exemplary embodiment, the upper through-holes 148 are positioned at an upper end of the legs 140. As shown in FIG. 11B, the sidewalls 142 of the legs 140 define second apertures, shown as lower through-holes 150. According to an exemplary embodiment, the lower through-holes 150 are positioned at a lower end of the legs 140.

As shown in FIGS. 8-9A, the slots 136 of the mounting brackets 120 are configured to receive the legs 140. According to an exemplary embodiment, the extension bracket 130 is configured to facilitate coupling a longer leg 140 to the mounting bracket 120 (e.g., for a taller truck 10, to construct a taller system 100, etc.). As shown in FIG. 8, the upper through-holes 126 at the upper end of the mounting brackets 120 are positioned to correspond with (e.g., align with, etc.) the upper through-holes 148 positioned at the upper end of the legs 140. A first fastener, shown as upper pin 182, is configured to be received by the upper through-holes 126 and the upper through-holes 148. According to an exemplary embodiment, the upper pin 182 is configured to pivotally and releasably couple the upper end of the legs 140 to the mounting brackets 120. In some embodiments, the lower through-holes 126 at the lower end of the mounting brackets 120 are positioned to correspond with (e.g., align with, etc.) the lower through-holes 150 positioned at the lower end of the legs 140 (e.g., to accommodate a short leg 140, etc.). In other embodiments, the through-holes 134 of the extension brackets 130 are positioned to correspond with (e.g., align with, etc.) the lower through-holes 150 positioned at the lower end of the legs 140 (e.g., to accommodate a longer leg 140, etc.). As shown in FIGS. 7 and 11A-11B, a second fastener, shown as lower pin 184, is configured to be received by one of (i) the lower through-holes 126 of the mounting bracket 120 and the lower through-holes 150 of the leg 140 and (ii) the through-holes 134 of the extension bracket 130 and the lower through-holes 150 of the leg 140 (e.g., depending on the length of the legs 140, etc.). According to an exemplary embodiment, the lower pin 184 is configured to pivotally and releasably couple the lower end of the legs 140 to the mounting brackets 120.

As shown in FIGS. 9A-9C, the clamps 190 are configured to couple the rails 160 to the legs 140. According to an exemplary embodiment, the clamps 190 are configured to slidably couple the rails 160 to the legs 140. Slidably coupling the rails 160 to the legs 140 may facilitate selectively repositioning the rails 160 along a longitudinal length (e.g., along the longitudinal axis 14, etc.) of a vehicle (e.g., the truck 10, etc.) relative to the legs 140 and the mounting brackets 120. The rails 160 may thereby be repositioned without cutting, welding, and/or drilling. As shown in FIGS. 5, 7, and 9A, the system 100 includes three rails 160 coupled to the legs 140 by a corresponding number of clamps 190. In other embodiments, the system 100 includes more or fewer rails 160 (e.g., one, two, four, etc.) and a corresponding number of clamps 190.

As shown in FIGS. 9B-9C, the rails 160 define an extrusion profile that includes a first wall, shown as front wall 162, a pair of sidewalls, shown as sidewalls 164, and a pair of back walls, shown as interfacing walls 166 (e.g., an upper interfacing wall 166, a lower interfacing wall 166, etc.). In an alternative embodiment, the rails 160 include a single interfacing wall 166. As shown in FIGS. 9B-9C, the rail 160 define a cavity, shown as channel 168. The channel 168 is configured to receive a plate, shown as clamping plate 192, of the clamp 190 such that the interfacing walls 166 of the rail 160 are disposed between the clamping plate 192 of the clamp 190 and the front wall 144 of the leg 140. As shown in FIG. 9C, the front walls 144 of the legs 140 define apertures, shown as clamping apertures 146. As shown in FIG. 9C, the clamping plate 192 defines corresponding apertures, shown as clamping apertures 194. The clamping apertures 146 and the clamping apertures 194 are configured to receive fasteners, shown as bolts 196. According to an exemplary embodiment, the clamping apertures 194 are threaded such that tightening the bolts 196 causes the clamping plate 192 to apply a clamping force to the interfacing walls 166 to fix the rails 160 (e.g., in a desired longitudinal location, etc.). In other embodiments, a corresponding fastener (e.g., a nut, etc.) is welded onto the clamping plate 192 in alignment with the clamping apertures 194 to receive the bolt 196.

As shown in FIGS. 9B-9C, the interfacing walls 166 are spaced a distance apart defining a gap therebetween. The spacing of the gap facilitates inserting the bolts 196 and/or the clamping plate 192 into the channel 168 of the rails 160, according to an exemplary embodiment. The shape of the extrusion profile and the clamping plate 192 facilitates slidably repositioning the rails 160 along the length of a vehicle when the bolts 196 are not tightened completely (e.g., a loose interaction between the clamping plate 192 and the interfacing walls 166, since the rails 160 do not have holes that receive the bolts 196 that may otherwise restrict movement, etc.). According to an exemplary embodiment, the number of clamping apertures 146 correspond with the number of rails 160 coupled to the legs 140 (e.g., two per rail 160, etc.). In other embodiments, the front walls 144 of the legs 140 define a plurality of clamping apertures 146 equally spaced along the length of the front wall 144 to facilitate different spacing distances between and/or vertical positons of the rails 160 and/or for adding additional rails 160 to the system 100.

As shown in FIGS. 5-7, the deflector 170 is positioned at the front of the system 100 (e.g., proximate the front wheels 20, etc.). The deflector 170 includes a curved plate, shown as curved panel 172, a front plate, shown as front panel 174, a top plate, shown as top panel 176, and a bottom plate, shown as bottom panel 178. As shown in FIG. 7, the front panel 174 is aligned with the front walls 162 of the rails 160. According to an exemplary embodiment, the front panel 174 is configured to extend the entire height between the rails 160 (e.g., from the bottom of the bottom rail 160 to the top to the top rail 160, etc.). As shown in FIG. 7, the front panel 174 extends along a portion of the longitudinal length of the rails 160. In other embodiments, the front panel 174 extends the entire longitudinal length of the rails 160. As shown in FIGS. 6-7, the top panel 176 and the bottom panel 178 are disposed along a portion of the sidewalls 164 of the rails 160 (e.g., the top panel 176 is disposed along the top sidewall 164 of the top rail 160, the bottom panel 178 is disposed along the bottom sidewall 164 of the bottom rail 160, etc.). According to an exemplary embodiment, at least one of the front panel 174, the top panel 176, and the bottom panel 178 are coupled (e.g., welded, bolted, riveted, glued, screwed, etc.) to the rails 160. As shown in FIGS. 5-7, the curved panel 172 is positioned at the front of the deflector 170 (e.g., proximate the front wheels 20, etc.). The curved panel 172 of the deflector 170 is configured to cover the leading edge of the rails 160, according to the exemplary embodiment shown in FIGS. 5-7.

Figure 10:
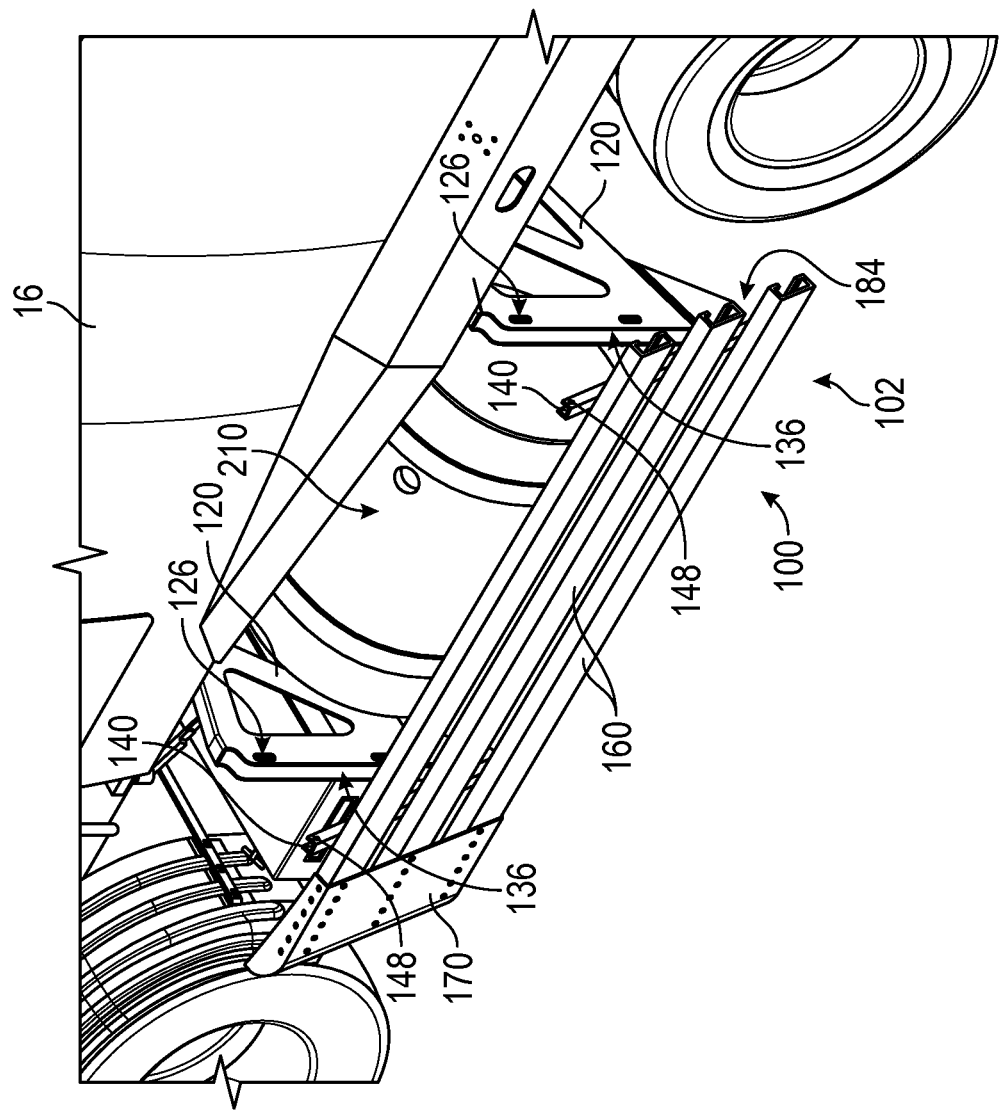
FIG. 10 is a perspective view of a lateral access limitation system configured in a first orientation, according to an exemplary embodiment.

Referring now to FIGS. 10-11B, the system 100 is configured to be selectively rotatable in two rotational directions (e.g., upward about the upper end of the leg 140 and outward about the lower end of the leg 140, etc.). As shown in FIG. 10, the system 100 is selectively rotated outward about the lower pin 184, reconfiguring the system 100 into a first orientation 102 (e.g., from a nominal position, a non-rotated position, an access limitation orientation as shown in FIG. 5, etc.). According to an exemplary embodiment, reconfiguring the system 100 in the first orientation 102 includes removing the upper pins 182 from the upper through-holes 126 of the mounting brackets 120 and the upper through-holes 148 of the legs 140. Removing the upper pins 182 decouples the upper end of the legs 140 from the mounting brackets 120 such that the upper end of the legs 140 may rotate about the lower pins 184 away from the body assembly 16 of the truck 10. As shown in FIG. 10, reconfiguring the system 100 in the first orientation 102 facilitates accessing the vehicle components 210 from the top of the system 100. According to an exemplary embodiment, the system 100 includes a lanyard (e.g., a cable, a leash, a chain, etc.) coupled to the legs 140 and/or another portion of the system 100 and at least one of the body assembly 16, the mounting brackets 120, and the frame 12. The lanyard may be configured to limit an amount of rotation (e.g., 20 degrees, 50 degrees, 90 degrees, etc.) of the legs 140 about the lower pins 184 such that the system 100 opens to a set position relative the body assembly 16. In other embodiments, the rotation of the legs 140 is otherwise limited when reconfigured into the first orientation 102 (e.g., with a linear actuator, a damper, etc.).

As shown in FIGS. 11A-11B, the system 100 is selectively rotated upward about the upper pin 182, reconfiguring the system 100 into a second orientation 104 (e.g., from a nominal position, a non-rotated position, etc.). According to an exemplary embodiment, reconfiguring the system 100 in the second orientation 104 includes removing the lower pins 184 from (i) the lower through-holes 126 of the mounting brackets 120 or the through-holes 134 of the extension bracket 130 and (ii) the lower through-holes 150 of the legs 140. Removing the lower pins 184 decouples the lower end of the legs 140 from the mounting brackets 120 such that the lower end of the legs 140 may rotate about the upper pins 182 away from the body assembly 16 of the truck 10. As shown in FIGS. 11A-11B, reconfiguring the system 100 into the second orientation 104 facilitates accessing the vehicle components 210 from the bottom of the system 100. In some embodiments, the system 100 includes an actuator (e.g., a hydraulic actuator, a pneumatic actuator, an electric actuator, etc.) coupled to the legs 140 and/or another portion of the system 100 and at least one of the body assembly 16, the mounting brackets 120, and the frame 12. The actuator may be configured to assist in and/or drive the rotation of a portion of the system 100 (e.g., the legs 140, the rails 160, the deflector 170, etc.) away from the body assembly 16 about the upper pins 182. In some embodiments, a retaining mechanism (e.g., a clasp, a chain, a leash, etc.) is coupled to the body assembly 16 and a portion of the system 100 to hold the system 100 in a desired position when reconfigured into the second orientation 104. By way of example, the system 100 may be rotated about the upper pins 182 and clipped to the body assembly 16 such that the system 100 is held in the second orientation 104 (e.g., while an operator accesses the protected region 200, etc.).

According to an exemplary embodiment, rotation of the system 100 upward and downward facilitates accessing the vehicle components 210 and/or facilitates gaining access to a specific location within the protected region 200 (e.g., to perform maintenance, refill a fluid, etc.). By way of example, vehicle components 210 such as a fuel tank and/or a DEF tank may be positioned such that fill openings thereof are towards the top of the system 100, and a tool box, a storage compartment, and/or a battery may be positioned towards the bottom of the system 100. Reconfiguring the system 100 into the first orientation 102 may facilitate access to the fuel tank and DEF tank, rather than having to pivot the system 100 substantially further about the upper pins 182. Thus, pivoting the system 100 about the lower pins 184 may require only 20 degrees of rotation, while pivoting about the upper pins 182 may require over 150 degrees of rotation to access the same vehicle components 210, increasing the serviceability of a vehicle with the system 100 installed. In some embodiments, the system 100 includes a locking mechanism that prevents at least one of the upper pins 182 and the lower pins 184 from being removed without a key (e.g., a physical key, a key code, etc.). Thus, the locking mechanism may prevent unauthorized access to the protected region 200.

Figure 12:
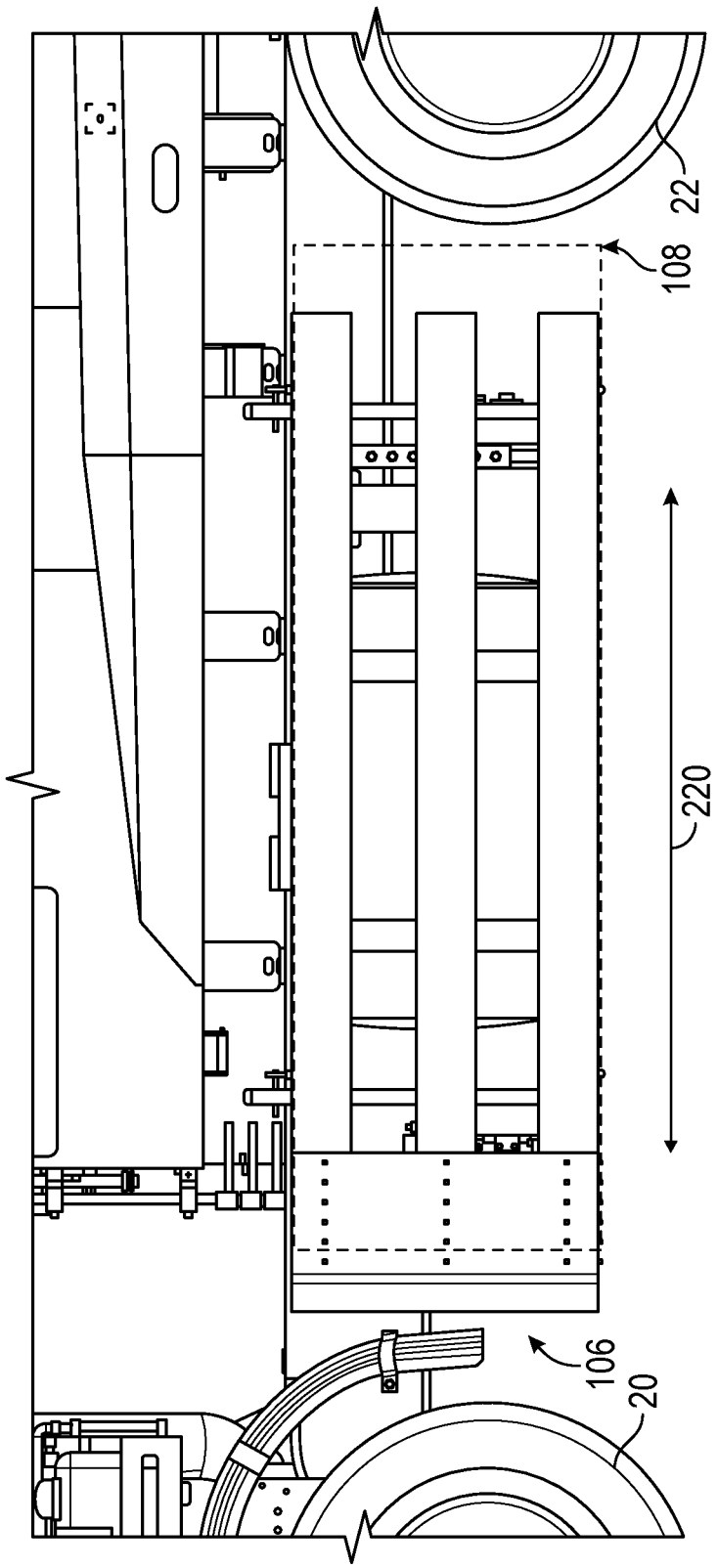
FIG. 12 is a side view of a lateral access limitation system oriented in a first longitudinal position and oriented in a second longitudinal position, according to an exemplary embodiment.

As shown in FIG. 12, the rails 160 of the system 100 are configured to be selectively repositionable along a longitudinal length of the vehicle relative to the legs 140 and the mounting brackets 120. By way of example, the mounting location of the mounting brackets 120 may vary based on the chassis and body to which the system 100 is coupled. According to an exemplary embodiment, the mounting location of the mounting brackets 120 for the system 100 varies based on the chassis and the space claimed by the vehicle components 210 coupled to the chassis and body. The variability in the location of mounting brackets traditionally requires custom drilling and/or custom weldments to mount a lateral access limitation system within the available spacing of the particular chassis layout. However, according to an exemplary embodiment, the rails 160 of the system 100 facilitate installing the mounting brackets 120 at any open location along the frame 12 and/or body assembly 16. The extrusion profile of the rails 160 and the clamps 190 eliminate the need from customized drilling and/or welding for different mounting locations.

As shown in FIG. 12, the rails 160 are repositionable along the longitudinal length of a vehicle (e.g., along the longitudinal axis 14 of the truck 10, etc.) as indicated by directional arrow 220. As shown in FIG. 12, the rails 160 are repositionable between a first longitudinal position 106 and a second longitudinal position 108. Although FIG. 12 only shows the rails 160 in the first longitudinal position 106 and the second longitudinal position 108, it should be understood that the rails 160 are infinitely repositionable between the front wheels 20 and the rear wheels 22 (or an available space where the system 100 is otherwise installed), according to an exemplary embodiment.

According to an exemplary embodiment, reconfiguring the system 100 between the first longitudinal position 106 and the second longitudinal position 108 includes: loosening the bolts 196 such that the clamping plates 192 do not provide a substantial clamping force to the rails 160 (e.g., the interaction between the interfacing walls 166, the clamping plate 192, and the front wall 144 of the leg 140 is relaxed such that the rails 160 are able to slide, etc.); repositioning (e.g., sliding, etc.) the rails 160 into a desired location from the initial location (e.g., from the first longitudinal position 106 to the second longitudinal position 108, etc.); and tightening the bolts 196 such that the clamping plates 192 apply a clamping force to the rails 160 (e.g., the interfacing walls 166, etc.), longitudinally fixing the rails 160 in the desired location.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the lateral access limitation system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A lateral access limitation system for a vehicle, the lateral access limitation system comprising:
    a first structural member configured to be coupled to a side portion of the vehicle, the first structural member including a pair of sidewalls spaced apart such that the pair of sidewalls define a U-channel;
    a second structural member including a first end and an opposing second end, wherein the first end and the opposing second end of the second structural member are releasably coupled to the first structural member such that the second structural member is selectively received by and disposed within the U-channel; and
    a third structural member coupled to the second structural member, wherein the third structural member is positioned to prevent unintended access to a protected region;
    wherein the second structural member and the third structural member are configured to selectively pivot about both the first end and the opposing second end of the second structural member to facilitate accessing the protected region.

2. The lateral access limitation system of claim 1, wherein an end of the first structural member defines a first through-hole.

3. The lateral access limitation system of claim 2, wherein the first end of the second structural member defines a second through-hole positioned to correspond with the first through-hole of the first structural member.

4. The lateral access limitation system of claim 3, further comprising a first fastener configured to be selectively received by the first through-hole and the second through-hole to thereby pivotally and releasably couple the first end of the second structural member to the first structural member.

5. The lateral access limitation system of claim 4, wherein an opposing end of the first structural member defines a third through-hole.

6. The lateral access limitation system of claim 5, wherein the opposing second end of the second structural member defines a fourth through-hole positioned to correspond with the third through-hole of the first structural member.

7. The lateral access limitation system of claim 6, further comprising a second fastener configured to be selectively received by the third through-hole and the fourth through-hole to thereby pivotally and releasably couple the opposing second end of the second structural member to the first structural member.

8. The lateral access limitation system of claim 1, wherein the third structural member is slidably coupled to the second structural member and selectively repositionable along a longitudinal length of the vehicle relative to the first structural member and the second structural member.

9. The lateral access limitation system of claim 1, wherein the third structural member includes a plurality of elements spaced between the first end and the opposing second end of the second structural member.

10. The lateral access limitation system of claim 1, further comprising a deflector positioned to cover a leading edge of the third structural member, the deflector extending at least partially along a longitudinal length of the third structural member.

11. A lateral access limitation system for a vehicle, the lateral access limitation system comprising:
    a bracket configured to be coupled to at least one of a chassis and a body of the vehicle;
    a leg configured to interface with the bracket;
    a rail positioned to prevent unintended access to a protected region, the rail having a front wall, a pair of sidewalls, and a pair of interfacing walls that cooperatively define a channel; and
    a coupler including a plate and a fastener, the plate positioned to be received within the channel of the rail to slidably couple the rail to the leg such that the rail is selectively repositionable along a longitudinal length of the vehicle relative to the leg and the bracket,
    wherein the leg and the rail are selectively repositionable relative to the bracket between a first angled orientation, a second angled orientation, and an access limitation orientation.

12. The lateral access limitation system of claim 11, wherein the pair of interfacing walls are spaced a distance apart and thereby define a gap, wherein the fastener is positioned to extend from the leg, through the gap, and engage the plate such that the pair of interfacing walls are secured between the leg and the plate.

13. The lateral access limitation system of claim 11, wherein the rail includes a plurality of elements spaced between an upper end and a lower end of the leg, and wherein the coupler includes a plurality of couplers that correspond with the plurality of elements.

14. The lateral access limitation system of claim 11, wherein the leg is releasably coupled to the bracket at a lower end and an upper end thereof such that the leg and the rail are configured to pivot about the lower end and the upper end of the leg to facilitate accessing the protected region of the vehicle.

15. A vehicle, comprising:
a chassis;
a body coupled to the chassis; and
a vehicle access limitation system positioned to prevent unintended access to a protected region of the vehicle, the vehicle access limitation system including:
a bracket coupled to at least one of the chassis and the body of the vehicle;
a leg having a lower end and an upper end, wherein the lower end and the upper end of the leg are releasably and pivotally coupled to the bracket;
a rail having a front wall, a pair of sidewalls, and a pair of interfacing walls that cooperatively define a channel; and
a coupler including a plate and a fastener, the plate positioned to be received within the channel of the rail to slidably couple the rail to the leg such that the rail is selectively repositionable along a longitudinal length of the vehicle relative to the leg and the bracket;
wherein the leg and the rail are configured to selectively pivot relative to the bracket downward and upward about the lower end and the upper end of the leg to thereby provide access to the protected region.

* * * * *